United States Patent

Ninomiya et al.

[11] Patent Number: 5,911,949
[45] Date of Patent: Jun. 15, 1999

[54] ABRASION RESISTANT COPPER ALLOY

[75] Inventors: Ryuji Ninomiya; Takeshi Ojiro, both of Saitama; Makoto Kano, Yokohama; Hidenobu Matsuyama, Kanagawa, all of Japan

[73] Assignees: Nissan Motor Co., Ltd., Kanagawa; Mitsui Mining & Smelting Co., Ltd., Tokyo, both of Japan

[21] Appl. No.: 08/931,498

[22] Filed: Sep. 16, 1997

[30] Foreign Application Priority Data

Sep. 20, 1996 [JP] Japan ..................................... 8-250545

[51] Int. Cl.$^6$ ...................................................... C22C 9/06
[52] U.S. Cl. .......................... 420/487; 420/488; 420/490; 420/495; 428/652
[58] Field of Search .................................. 420/488, 490, 420/487, 495, 499, 469; 428/652

[56] References Cited

U.S. PATENT DOCUMENTS

| | | | |
|---|---|---|---|
| 2,430,306 | 11/1947 | Smith | 420/488 |
| 3,635,702 | 1/1972 | Badia | 420/488 |
| 4,897,243 | 1/1990 | Mizuhara | 420/488 |
| 5,019,185 | 5/1991 | Nakajima et al. | 420/488 |
| 5,028,391 | 7/1991 | Ingerson | 420/488 |
| 5,188,799 | 2/1993 | Mori et al. | 420/488 |
| 5,586,530 | 12/1996 | Adachi et al. | 123/188.8 |

FOREIGN PATENT DOCUMENTS

| | | |
|---|---|---|
| 8-35027 | 2/1996 | Japan . |
| 569408 | 5/1945 | United Kingdom ................... 420/488 |

OTHER PUBLICATIONS

Heat–resisting steel bars *JSI G 4311* 1991 (no month).
Aluminium alloy casting *JIS H 5202* 1992 (no month).

*Primary Examiner*—John J. Zimmerman
*Attorney, Agent, or Firm*—Foley & Lardner

[57] ABSTRACT

An abrasion resistant copper alloy suitable for the material of an overlaid layer formed at the valve seat of an engine cylinder head formed of aluminum alloy. The copper alloy consists essentially of nickel in an amount ranging from 10 to 30% by weight; silicon in an amount ranging from 0.5 to 5.0% by weight; at least one element selected from the group consisting of molybdenum, tungsten, tantalum, niobium and vanadium, in an amount ranging from 2.0 to 15.0% by weight; and balance being copper and impurities.

3 Claims, No Drawings

ABRASION RESISTANT COPPER ALLOY

The contents of Japanese Patent Application No. 8-250545, with a filing date of Sept. 20, 1996 in Japan, are hereby incorporated by reference.

BACKGROUND OF THE INVENTION

1. Field of the Invention

This invention relates to a copper alloy high in abrasion resistance, and more particularly to the copper alloy which is suitable for the powder material of an overlaid layer formed at a frictionally sliding part of an engine, for example, a valve seat or the like in an engine cylinder head formed of aluminum alloy.

2. Description of the Prior Art

Powder materials of an overlaid layer to be formed at a frictionally sliding part of an engine has been proposed in Japanese Patent Provisional Publication No. 8-35027. An example of the powder materials is formed of a copper alloy which consists essentially of 1.0 to 5.0 wt % of aluminum, 0.1 to 5.0 wt % of at least one of vanadium, Niobium and Tantalum in the group Va of the periodic table of elements, 1.0 to 5.0 wt % of silicon, and balance being copper and impurities. Cobalt, iron manganese are optionally added to the copper alloy of the powder material if necessary.

In case of forming the overlaid layer on the base material of aluminum alloy by using the above copper alloy powder material under the action of laser beam, a metallographic structure high in abrasion resistance can be obtained; however, when formation of the overlaid layer under a high power output laser beam is made in order to raise a productivity, dilution of aluminum alloy as the base material occurs providing such a tendency as to result in material defects and material structures low in abrasion resistance.

BRIEF SUMMARY OF THE INVENTION

It is an object of the present invention to provide an improved copper alloy which is high in abrasion resistance and can effectively overcome drawbacks encountered in conventional similar copper alloys.

Another object of the present invention is to provide an improved copper alloy which is for the material of, for example, an overlaid layer formed at the valve seat of an engine cylinder head formed of aluminum alloy, the copper alloy being high in productivity of the overlaid layer while maintaining a high abrasion resistance of the overlaid layer.

A further object of the present invention is to provide an improved copper alloy which cannot cause dilution of the base material of aluminum alloy, for example, in case of forming an overlaid layer at the valve seat of an engine cylinder head formed of the base material.

The present inventors have conducted experiments on a variety of copper alloy material composition systems and found to attain the above objects, for example, by omitting addition of aluminum thereby to suppress dilution of a base material in case that the base material is an aluminum alloy, by omitting addition of cobalt (Co) high in melting point, by forming a basic copper alloy consisting of nickel, silicon, at least one element selected from the group consisting of molybdenum, tungsten, tantalum, niobium and vanadium, and optionally further consisting of iron, chromium, Misch metal, phosphorus, manganese and/or boron.

A first aspect of the present invention resides in an abrasion resistant copper alloy consisting essentially of nickel in an amount ranging from 10 to 30% by weight; silicon in an amount ranging from 0.5 to 5.0% by weight; at least one element selected from the group consisting of molybdenum, tungsten, tantalum, niobium and vanadium, in an amount ranging from 2.0 to 15.0% by weight; and balance being copper and impurities.

A second aspect of the present invention resides in an overlaid layer formed on aluminum alloy by using laser, formed of an abrasion resistant copper alloy consisting essentially of nickel in an amount ranging from 10 to 30% by weight; silicon in an amount ranging from 0.5 to 5.0% by weight; at least one element selected from the group consisting of molybdenum, tungsten, tantalum, niobium and vanadium, in an amount ranging from 2.0 to 15.0% by weight; and balance being copper and impurities.

A third aspect of the present invention resides in an material comprising an aluminum alloy; and an overlaid layer formed on the aluminum alloy by using laser and formed of a high temperature abrasion resistant copper alloy consisting essentially of nickel in an amount ranging from 10 to 30% by weight; silicon in an amount ranging from 0.5 to 5.0% by weight; at least one element selected from the group consisting of molybdenum, tungsten, tantalum, niobium and vanadium, in an amount ranging from 2.0 to 15.0% by weight; and balance being copper and impurities.

A fourth aspect of the present invention resides in a cylinder head of an engine, comprising a valve seat formed of an aluminum alloy; and an overlaid layer formed on the valve seat by using laser and formed of an abrasion resistant copper alloy, the overlaid layer being to be frictionally contactable with an engine valve, the abrasion resistance copper alloy consisting essentially of nickel in an amount ranging from 10 to 30% by weight; silicon in an amount ranging from 0.5 to 5.0% by weight; at least one element selected from the group consisting of molybdenum, tungsten, tantalum, niobium and vanadium, in an amount ranging from 2.0 to 15.0% by weight; and balance being copper and impurities.

According to the first to fourth aspects of the present invention, the copper alloy contains no aluminum and therefore never dilute an aluminum alloy as a base material in case of forming an overlaid layer at the base material. This effectively prevents formation of material defects and material structures low in abrasion resistance, and provides the overlaid layer of the copper alloy which is high in abrasion resistance.

A fifth aspect of the present invention resides in an abrasion resistant copper alloy consisting essentially of nickel in an amount ranging from 10 to 30% by weight; silicon in an amount ranging from 0.5 to 5.0% by weight; at least one element selected from the group consisting of molybdenum, tungsten, tantalum, niobium and vanadium, in an amount ranging from 2.0 to 15.0% by weight; at least one element selected from the group consisting of iron and chromium, the iron being in an amount ranging from 2.0 to 15.0% by weight, the chromium being in an amount ranging from 1.0 to 10.0% by weight; and balance being copper and impurities.

A sixth aspect of the present invention resides in an abrasion resistant copper alloy consisting essentially of nickel in an amount ranging from 10 to 30% by weight; silicon in an amount ranging from 0.5 to 5.0% by weight; at least one element selected from the group consisting of molybdenum, tungsten, tantalum, niobium and vanadium, in an amount ranging from 2.0 to 15.0% by weight; at least one element selected from the group consisting of iron and chromium, the iron being in an amount ranging from 2.0 to 15.0% by weight, the chromium being in an amount ranging from 1.0 to 10.0% by weight; at least one substance selected from the group consisting of Misch metal and phosphorus, the Misch metal being in an amount ranging from 0.01 to 0.1% by weight, the phosphorus being in an amount ranging from 0.1 to 1.0% by weight; and balance being copper and impurities.

A seventh aspect of the present invention resides in an abrasion resistant copper alloy consisting essentially of nickel in an amount ranging from 10 to 30% by weight; silicon in an amount ranging from 0.5 to 5.0% by weight; at least one element selected from the group consisting of molybdenum, tungsten, tantalum, niobium and vanadium, in an amount ranging from 2.0 to 15.0% by weight; at least one element selected from the group consisting of iron and chromium, the iron being in an amount ranging from 2.0 to 15.0% by weight, the chromium being in an amount ranging from 1.0 to 10.0% by weight; at least one substance selected from the group consisting of Misch metal and phosphorus, the Misch metal being in an amount ranging from 0.01 to 0.1% by weight, the phosphorus being in an amount ranging from 0.1 to 1.0% by weight; manganese in an amount ranging from 1.0 to 10.0% by weight; balance being copper and impurities.

An eighth aspect of the present invention resides in an abrasion resistant copper alloy consisting essentially of nickel in an amount ranging from 10 to 30% by weight; silicon in an amount ranging from 0.5 to 5.0% by weight; at least one element selected from the group consisting of molybdenum, tungsten, tantalum, niobium and vanadium, in an amount ranging from 2.0 to 15.0% by weight; at least one element selected from the group consisting of iron and chromium, the iron being in an amount ranging from 2.0 to 15.0% by weight, the chromium being in an amount ranging from 1.0 to 10.0% by weight; at least one substance selected from the group consisting of Misch metal and phosphorus, the Misch metal being in an amount ranging from 0.01 to 0.1% by weight, the phosphorus being in an amount ranging from 0.1 to 1.0% by weight; manganese in an amount ranging from 1.0 to 10.0% by weight; boron in an amount ranging from 0.5 to 3.0% by weight; and balance being copper and impurities.

According to the fifth to eighth aspects of the present invention, the copper alloy can be further effectively prevented from formation of the material defects and material structures low in abrasion resistance.

DETAILED DESCRIPTION OF THE INVENTION

According to the present invention, an abrasion resistant copper alloy consists essentially of nickel in an amount of 10 to 30% by weight; silicon in an amount ranging from 0.5 to 5.0% by weight; at least one element selected from the group consisting of molybdenum, tungsten, tantalum, niobium and vanadium, in an amount ranging from 2.0 to 15.0% by weight; and balance being copper and impurities.

Hereinafter, discussion will be made on components of the copper alloy of the present invention.

Ni (nickel)

Ni is an element to be effective for improving abrasion resistance of the copper alloy. In order to obtain such improvement effects, it is necessary that the copper alloy contains 10% by weight of Ni. However, if the content of Ni exceeds 30% by weight, many defective portions are formed in an overlaid layer in case that the overlaid layer is formed on a metal base material. Additionally, the defective portions may be peeled off from the surface of the metal base material thereby to form pits after the overlaid layer is subjected to frictionally sliding action. Thus, the content of Ni is decided within a range of 10 to 30% by weight.

Si (silicon)

Si is an element to be effective for offering a copper alloy structure in which hard precipitates formed of silicide are dispersed, thereby effectively improving an abrasion resistance of the copper alloy. In order to obtain such improvement effects, it is necessary that the content of Si is not less than 0.5% by weight. However, if the content of Si exceeds 5.0% by weight, many defective portions may be formed in the overlaid layer. Thus, the content of Si is decided within a range of from 0.5 to 5.0% by weight.

Mo (molybdenum), W (tungsten), Ta (tantalum), Nb (niobium) and/or V (vanadium)

Mo, W, Ta, Nb and/or V are elements to be effective for improving an abrasion resistance of the copper alloy. In order to obtain such improvement effects, it is necessary that the total content of these elements is not less than 2.0%. However, if the total content of these elements exceeds 15% by weight, many defective portions are formed in the overlaid layer, so that the defective portions may be peeled off from the surface of the metal base material thereby to form pits after the overlaid layer is subjected to frictionally sliding action. Thus, the total content of at least one element of Mo, W, Ta, Nb and V is decided within a range of from 2.0 to 15.0% by weight.

The copper alloy optionally contains the following elements.

Iron (Fe) and/or Chromium (Cr)

Fe and Cr are elements to be effective for further improving the abrasion resistance of the copper alloy. In order to obtain such improvement effects, it is preferable that the content of Fe is not less than 2.0% by weight, and the content of Cr is not less than 1.0% by weight. However, the content of these elements are excessive, many defective portions may be formed in the overlaid layer. Accordingly, the content of Fe is preferably not more than 15.0% by weight, and the content of Cr is not more than 10.0% by weight. Thus, the content of Fe is decided within a range of from 2.0 to 15.0% by weight, and the content of Cr is decided within a range of from 1.0 to 10.0% by weight.

Mm (Misch metal) and/or P (phosphorus)

Mm and P are elements to be effective for suppressing formation of defective portions in the overlaid layer. In order to obtain such effects, it is preferable that the content of Mm is not less than 0.01% by weight, and the content of P is not less than 0.1% by weight. However, the abrasion resistance of the copper alloy is lowered if the content of Mm and/or P is excessive. Accordingly, the content of Mm is not more than 0.1% by weight, and the content of P is not more than 1.0% by weight. Thus, the content of Mm is within a range of from 0.01 to 0.1% by weight, and the content of P is within a range of from 0.1 to 1.0% by weight.

Mn (manganese)

Mn is an element to be effective for suppressing production of the defective portions in the overlaid layer. In order to obrain such effects, it is preferable that the content of Mn is not less than 1.0% by weight. However, if the content of Mn exceeds 10.0% by weight, the abrasion resistance of the copper alloy is lowered. Thus, the content of Mn is decided within a range of from 1.0 to 10.0% by weight.

B (boron)

B is an element to be effective for suppressing formation of the defective portions in the overlaid layer. In order to obtain such effects, it is preferable that the content of B is not less than 0.5% by weight. However, if the content of B exceeds 3.0% by weight, the abrasion resistance of the copper alloy is lowered.

The copper alloy of the present invention has the above-discussed chemical compositions in which it is preferable that a suitable amount of Si and elements required for formation of silicide are contained to provide a structure in which the hard precipitates formed of silicide are dispersed. This further improves the abrasion resistance of the copper alloy of the present invention.

The present invention will be more readily understood with reference to Examples in comparison with Comparative Example; however, these Examples are intended to illustrate embodiments and are not to be construed to limit the scope of the invention.

EXAMPLES

First, metal powders corresponding to Examples 1 to 12, Comarative Examples 1 to 10 and a Conventional Example 1 were prepared having respective chemical compositions shown in Tables 1 and 2. Each of the metal powders was prepared as follows: Raw materials (metals) were molten in a graphite crucible by using a high frequency induction furnace to obtain a copper alloy molten metal having the composition shown in the column of Examples 1 to 12 in Table 1, Comparative Examples 1 to 10 in Table 2 and a Conventional Example 1 (corresponding to a copper alloy in Japanese Patent Provisional Publication No. 8-35027) in Table 2. The copper alloy molten metal was powdered by gas atomization while being flown downwardly through the bottom of the crucible, thus forming powdered copper alloy. The powdered copper alloy was then subjected to dehydration and degassing, and further subjected to a particle size distribution control thereby obtaining metal powder for overlaying.

Subsequently, the metal powder was overlaid, by using $CO_2$ gas laser of 5 kW, at a groove formed on each valve seat of intake and exhaust valves in a cylinder head of an inline four cylinder DOHC engine, formed of an aluminum alloy (a material AC2A according to JIS H 5202) thereby to form an overlaid layer having a thickness of 3 mm or more under an overlaying condition shown in Table 1. In this overlaying operation, totally 16 overlaid layers were formed for each cylinder head. This provided a semi-finished cylinder head. For each metal powder, 10 semi-finished cylinder heads were produced.

TABLE 1

| | Chemical composition (wt %) | | | | | | | | | | | | |
|---|---|---|---|---|---|---|---|---|---|---|---|---|---|
| Sample | Ni | Si | Mo | W | Ta | Nb | V | Fe | Cr | Mm* | P | Mn | B |
| Example 1 | 11.0 | 0.5 | 2.0 | Nil | Nil | Nil | Nil | Nil | Nil | Nil | Nil | Nil | Nil |
| Example 2 | 15.2 | 2.5 | 3.2 | 3.5 | Nil | Nil | Nil | Nil | Nil | Nil | Nil | Nil | Nil |
| Example 3 | 29.3 | 5.0 | 10.3 | 4.5 | Nil | Nil | Nil | Nil | Nil | Nil | Nil | Nil | Nil |
| Example 4 | 16.5 | 2.6 | Nil | 1.1 | 0.4 | 0.6 | Nil | Nil | Nil | Nil | Nil | Nil | Nil |
| Example 5 | 14.8 | 2.4 | Nil | Nil | 0.8 | 1.5 | 0.5 | 2.4 | Nil | Nil | Nil | Nil | Nil |
| Example 6 | 15.5 | 2.7 | Nil | Nil | Nil | 1.5 | 0.7 | Nil | 1.4 | Nil | Nil | Nil | Nil |
| Example 7 | 15.3 | 2.6 | 5.6 | 5.1 | 4.2 | Nil | Nil | 7.5 | 5.2 | 0.02 | Nil | Nil | Nil |
| Example 8 | 16.1 | 2.5 | 5.2 | 3.4 | 3.3 | 3.0 | Nil | 7.2 | 5.4 | 0.02 | 0.12 | Nil | Nil |
| Example 9 | 15.7 | 2.4 | 5.4 | 3.2 | 3.5 | 1.5 | 1.1 | 14.7 | 9.8 | 0.09 | 0.22 | 1.2 | Nil |
| Example 10 | 15.4 | 2.4 | 5.2 | 3.3 | 3.1 | 1.4 | 1.4 | 7.2 | 5.4 | 0.08 | 0.96 | 2.2 | Nil |
| Example 11 | 16.3 | 2.6 | 5.1 | 3.2 | 3.0 | 1.4 | 1.3 | 7.4 | 5.6 | 0.08 | 0.97 | 5.4 | 0.54 |
| Example 12 | 15.4 | 2.8 | 5.5 | 3.5 | 3.2 | 1.3 | 1.4 | 7.1 | 5.5 | 0.07 | 0.95 | 9.5 | 2.85 |

Note
Mm*: La was used as a Misch metal.

TABLE 2

| | Chemical composition (wt %) | | | | | | | | | | | | |
|---|---|---|---|---|---|---|---|---|---|---|---|---|---|
| Sample | Ni | Si | Mo | W | Ta | Nb | V | Fe | Cr | Mm* | P | Mn | B |
| Comparative Example 1 | 4.8 | 0.2 | 1.3 | Nil | Nil | Nil | Nil | Nil | Nil | Nil | Nil | Nil | Nil |
| Comparative Example 2 | 35.6 | 5.6 | 3.4 | Nil | Nil | Nil | Nil | Nil | Nil | Nil | Nil | Nil | Nil |
| Comparative Example 3 | 15.6 | 2.6 | 1.2 | 0.2 | 0.2 | Nil | Nil | Nil | Nil | Nil | Nil | Nil | Nil |
| Comparative Example 4 | 14.8 | 2.8 | 0.7 | Nil | Nil | 0.5 | 0.3 | Nil | Nil | Nil | Nil | Nil | Nil |
| Comparative Example 5 | 15.3 | 2.5 | 16.5 | Nil | Nil | Nil | Nil | 1.4 | 0.4 | Nil | Nil | Nil | Nil |
| Comparative Example 6 | 16.2 | 2.4 | 5.3 | 3.4 | Nil | Nil | Nil | 16.4 | 11.2 | Nil | Nil | Nil | Nil |
| Comparative Example 7 | 15.8 | 2.6 | 5.2 | 5.5 | Nil | Nil | Nil | 7.5 | 5.4 | 0.004 | 0.04 | 0.4 | Nil |
| Comparative Example 8 | 15.0 | 2.4 | 5.1 | Nil | Nil | Nil | Nil | 7.4 | 5.2 | 0.17 | 1.52 | 0.3 | Nil |
| Comparative Example 9 | 15.2 | 2.5 | 5.0 | Nil | Nil | Nil | Nil | 7.8 | 5.4 | 0.07 | 0.98 | 11.3 | 0.3 |
| Comparative Example 10 | 15.3 | 2.6 | 5.5 | Nil | Nil | Nil | Nil | 7.7 | 5.5 | 0.08 | 0.12 | 9.4 | 3.6 |
| Conventional Example 1 | 12.2Ni—10.5Co—2.2Al—1.5Nb—1.1V—3.2Si | | | | | | | | | | | | |

Note
Mm*: La was used as a Misch metal.

TABLE 3

| Overlaying condition | |
| --- | --- |
| Laser power output | 5.0 kW |
| Processing speed | 1.0 m/min |
| Shield gas | Argon gas |
| Shield gas flow rate | 20 l/min |

The above semi-finished cylinder head was subjected to machining so that each overlaid layer was finished to have predetermined dimensions and a predetermined surface roughness, thereby providing a finished cylinder head.

Here, the finished cylinder head was subjected to an examination under a color checking in order to examine whether material defects (for example, shrinkage cavity, pore and microcrack) were formed in the overlaid layer or not. This examination was conducted on 160 valve seats of the 10 finished cylinder heads which were for each metal powder (sample) of the overlaid layers. The number of valve seats having the material defects was counted for each metal powder (sample) and is shown in the column of "Material defects" in Tables 5 and 6.

Subsequently, an actual engine test was conducted on one of the cylinder heads which did not have the material defects, for each metal power (sample), under an actual engine test condition shown in Table 4.

TABLE 4

| Actual engine test condition | |
| --- | --- |
| Engine used in test | Inline 4-cylinder DOHC (1998 cc) type |
| Fuel used in test | Regular nonleaded gasoline |
| Engine speed | 6,000 r.p.m. |
| Material of intake valve | Material corresponding to SUH 11 |
| Material of exhaust valve | Material corresponding to SUH 36 |
| Engine load | 4/4 |
| Test time | 100 hrs. |

After completion of the actual engine test, examination of external appearance of each valve seat and the valve face of each of intake and exhaust valves of the engine was conducted to examine abrasion depth ($\mu$m) of the valve seat and the valve face, and abrasion condition of the frictionally contacting surface of the valve seat. It will be understood that the valve face of the valve is in frictional contact with the valve seat which was located facing the valve face. The abrasion depth and the abrasion condition are shown respectively in the columns "Abrasion depth" and "Abrasion condition of valve seat" in Tables 5 and 6.

TABLE 5

| | Material defects* | Abrasion depth ($\mu$m) | | Abrasion condition of valve |
| --- | --- | --- | --- | --- |
| Sample | (number) | Valve seat | Valve face | seat |
| Example 1 | 2 | 25 | 12 | Slightly uneven |
| Example 2 | 4 | 21 | 11 | Slightly uneven |
| Example 3 | 9 | 14 | 18 | Smooth |
| Example 4 | 7 | 18 | 8 | Smooth |
| Example 5 | 8 | 8 | 5 | Smooth |
| Example 6 | 7 | 9 | 6 | Smooth |
| Example 7 | 4 | 6 | 4 | Smooth |
| Example 8 | 3 | 4 | 3 | Smooth |
| Example 9 | 2 | 2 | 2 | Smooth |
| Example 10 | 0 | 5 | 3 | Smooth |
| Example 11 | 1 | 4 | 4 | Smooth |
| Example 12 | 0 | 3 | 4 | Smooth |

Note
* Material defects: Number of valve seats having material defects in 160 valve seats of 10 cylinder heads

TABLE 6

| | Material defects* | Abrasion depth ($\mu$m) | | Abrasion condition of |
| --- | --- | --- | --- | --- |
| Sample | (number) | Valve seat | Valve face | valve seat |
| Comparative Example 1 | 2 | 56 | 35 | Ring-shaped groove formed |
| Comparative Example 2 | 25 | 12 | 8 | Pits formed |
| Comparative Example 3 | 5 | 34 | 22 | Ring-shaped groove formed |
| Comparative Example 4 | 8 | 38 | 26 | Ring-shaped groove formed |
| Comparative Exarnple 5 | 24 | 17 | 19 | Pits formed |
| Comparative Example 6 | 23 | 12 | 17 | Pits formed |
| Comparative Example 7 | 12 | 9 | 4 | Slightly uneven |
| Comparative Example 8 | 2 | 23 | 13 | Ring-shaped groove formed |
| Comparative Example 9 | 1 | 35 | 23 | Ring-shaped groove formed |
| Comparative Example 10 | 1 | 31 | 35 | Ring-shaped groove formed |
| Conventional Example 1 | 1 | 11 | 6 | Pits formed |

Note
*Material defects: Number of valve seats having material defects in 160 valve seats of 10 cylinder heads The above experimental results shown in Tables 5 and 6 demonstrate the following facts: The overlaid layers formed of the copper alloys (samples) of Examples 1 to 12 according to the present invention had a structure in which hard precipitates formed of silicide were dispersed, and therefore the overlaid layers were high in abrasion resistance. Additionally, the number of the valve seats having the material defects was less than 10. The abrasion amounts of the valve seats and the valve faces after the actual engine test were all small. The external appearance of the frictionally contacting surface of the valve seat was generally smooth so that no abrasion trace and/or no pit were produced thereby maintaining a good sealing ability of the valve to the valve seat.

In contrast, concerning Comparative Example 1 in which the content of Ni, Si and Mo was small, the overlaid layer formed of the copper alloy (sample) was insufficient in abrasion resistance of the valve seat. As a result, the abrasion amount (depth) of the valve seats was excessively large, producing abrasion powder. Owing to this abrasion powder, the abrasion amount (depth) of the opposite valve face also increased.

Concerning Comparative Example 2 in which the content of Ni and Si was large, the overlaid layer formed of the copper alloy (sample) at the valve seat were provided with many material defects. Additionally, although the actual engine test was conducted on the cylinder head which did not have the material defects, pits were found to be formed respectively at several portions of the valve seats after the actual engine test, the pits being assumed to be formed owing to peeling-off of portions having the material defects, located immediately below the frictionally contacting surface of the valve seat.

Concerning Comparative Example 3 in which the total content of Mo, W and Ta was less than 2% by weight, the overlaid layer formed, at the valve seat was insufficient in improvement of abrasion resistance, and therefore the abrasion amount (depth) of the valve seat was large while a ring-shaped groove was formed at the valve seat. Additionally, the abrasion amount (depth) of the opposite valve face was also large. Similar results were found also in Comparative Example 4 in which the total content of Mo, Nb and V was less than 2% by weight.

Concerning Comparative Example 5 in which the content of Mo exceeded 15% by weight, many material defects were produced in the overlaid layer at the valve seat similarly to the results of Comparative Example 2. Additionally, pits were found to be formed respectively at several portions of the valve seats after the actual engine test, the pit being assumed to be formed owing to peeling-off of portions having the material defect, located immediately below the frictionally contacting surface of the valve seat. Addition of a small amount of Fe and Cr was not recognized to contribute to improvements in abrasion resistance. Also concerning Comparative Example 6 in which Fe and Cr were added respectively in amounts exceeding 15% by weight and 10% by weight, similar results to Comparative Example 5 were obtained.

Concerning Comparative Example 7 in which less than 0.01 wt % of Mm (Misch metal) and less than 0.1 wt % of P were added to a composition system containing Ni, Si, Mo, W, Fe and Cr within content ranges of the present invention, the overlaid layer formed at the valve seat was improved; however, high improvement effects to material defects could not be recognized.

Concerning Comparative Example 8 in which the content of Mm (Misch metal) and P were contained to exceed respectively 0.1 wt % and 1.0 wt %, it was recognized that the overlaid layer formed at the valve seat exhibited effects for reducing the material defects; however, the overlaid layer was largely degraded in abrasion resistance. Also concerning Comparative Example 9 in which the content of Mn exceeds 10% by weight and Comparative Example 10 in which the content of B exceeded 3.0% by weight, results similar to those in Comparative Example 8 were obtained.

Concerning Conventional Example 1 corresponding to the copper alloy disclosed in Japanese Patent Provisional Publication No. 8-35027, the abrasion resistance based on the abrasion depth was good; however, many material defects were formed thereby excessively deteriorating the productivity under the above overlaying condition.

What is claimed is:

1. An abrasion resistant copper alloy consisting essentially of:

nickel in an amount ranging form 10 to 30% by weight;
silicon in an amount ranging from 0.5 to 5.0% by weight;
at least one element selected from the group consisting of molybdenum, tungsten, tantalum, niobium and vanadium, in an amount ranging from 2.0 to 15.0% by weight;
at least one element selected from the group consisting of iron and chromium, said iron if employed being in an amount ranging form 2.0 to 15.0% by weight, said chromium if employed being in an amount ranging from 1.0 to 10.0% by weight;
at least one substance selected from the group consisting of Misch metal and phosphorus, said Misch metal if employed being in an amount ranging from 0.01 to 0.1% by weight, said phosphorus if employed being in an amount ranging from 0.1 to 1.0% by weight; and
balance being copper and impurities.

2. An abrasion resistant copper alloy consisting essentially of:

nickel in an amount ranging from 10 to 30% by weight;
silicon in an amount ranging from 0.5 to 5.0% by weight;
at least one element elected from the group consisting of molybdenum, tungsten, tantalum, niobium and vanadium, in an amount ranging from 2.0 to 15.0% by weight;
at least one element selected from the group consisting of iron and chromium, said iron being in an amount ranging from 2.0 to 15.0% by weight, said chromium if employed being in an amount ranging from 1.0 to 10.0% by weight;
at least one substance selected from the group consisting of Misch metal and phosphorus, said Misch metal if employed being in an amount ranging from 0.01 to 0.1% by weight, said phosphorus if employed being in an amount ranging from 0.1 to 10.0% by weight; and
balance being copper and impurities.

3. An abrasion resistant copper alloy consisting essentially of:

nickel in an amount ranging from 10 to 30% by weight;
silicon in an amount ranging from 0.5 to 5.0% by weight;
at least one element selected from the group consisting of molybdenum, tungsten, tantalum, niobium and vanadium, in an amount ranging from 2.0 to 15.00% by weight;
at least one element selected from the group consisting of iron and chromium, said iron if employed being in an amount ranging from 2.0 to 15.0% by weight, said chromium if employed being in an amount ranging from 1.0 to 10.0% by weight;
at least one substance selected from the group consisting of Misch metal and phosphorus, said Misch metal if employed being in an amount ranging from 0.01 to 0.1% by weight, said phosphorus if employed being in an amount ranging from 0.1 to 1.0% by weight;
manganese in an amount ranging from 1.0 to 10.0% by weight;
boron in an amount ranging from 0.5 to 3.0% by weight; and
balance being copper and impurities.

* * * * *